United States Patent [19]
Lefort et al.

[11] Patent Number: 6,089,093
[45] Date of Patent: Jul. 18, 2000

[54] ACCELEROMETER AND METHOD FOR MAKING SAME

[75] Inventors: Olivier Lefort; Sylvie Pedraza-Ramos, both of Valence; René Presset, Etoile sur Rhone; Pierre Giroud, Bourg les Valence, all of France

[73] Assignee: Sextant Avionique, Velizy Villacoublay, France

[21] Appl. No.: 09/077,888

[22] PCT Filed: Dec. 10, 1996

[86] PCT No.: PCT/FR96/01968

§ 371 Date: Jul. 30, 1998

§ 102(e) Date: Jul. 30, 1998

[87] PCT Pub. No.: WO97/22010

PCT Pub. Date: Jun. 19, 1997

[30] Foreign Application Priority Data

Dec. 12, 1995 [FR] France ................................ 95 14686

[51] Int. Cl.[7] .............................. G01P 15/08; G01P 15/12
[52] U.S. Cl. .................................... 73/514.33; 73/514.16; 73/514.38

[58] Field of Search ........................ 73/514.16, 514.15, 73/514.24, 514.29, 514.33, 514.38; 338/5, 46

[56] References Cited

U.S. PATENT DOCUMENTS

| | | | |
|---|---|---|---|
| 4,882,933 | 11/1989 | Petersen et al. | 73/514.33 |
| 5,000,817 | 3/1991 | Aine | 73/514.24 |
| 5,008,774 | 4/1991 | Bullis et al. | 73/514.32 |
| 5,060,504 | 10/1991 | White et al. | 73/514.33 |
| 5,640,711 | 6/1997 | Lefort et al. | 2/6.3 |
| 5,764,417 | 6/1998 | Francois et al. | 359/630 |
| 5,777,227 | 7/1998 | Cho et al. | 73/514.38 |

*Primary Examiner*—Helen C. Kwok
*Attorney, Agent, or Firm*—Oblon, Spivak, McClelland, Maier & Neustadt, P.C.

[57] ABSTRACT

An accelerometer based on monocrystalline silicon. A moving mass is connected to a fixed frame by suspension arms. The sensor is produced in the stack of two silicon wafers in which stop and counter-stop functions are produced so as to limit the amplitude of the movements of the moving mass.

14 Claims, 7 Drawing Sheets

ACCELEROMETER AND METHOD FOR MAKING SAME

BACKGROUND OF THE INVENTION

1. Field of the Invention

The field of the invention is that of deformable microstructures with two-directional operation, particularly that of accelerometers comprising a moving mass connected to a fixed frame via slender suspension arms.

2. Discussion of the Background

The accelerations experienced by the moving mass may typically be detected thanks to the presence of piezoresistive gauges on the slender suspension arms. Such piezoresistive gauges may also control an electromagnetic device for controlling the moving mass, in order to compensate for its displacements.

In this case, the accelerometer strain gauges are intended to generate, by means of an electronic circuit, a supply current for a coil which, using phenomena of electromagnetic induction, compensates for a displacement of the moving mass under the effect of external conditions, for example seismic movements.

At the present time, such accelerometers can be built using silicon wafers, using silicon etching techniques developed in the context of the manufacture of semiconductor electronic components. The use of such technologies allows the moving mass and the elements associated with it to be produced by a collective process on slices of silicon and thus allows a series of acceleration sensors to be defined, using a limited number of technological steps.

Typically, the manufacture of this type of sensor comprises assembling several silicon wafers, at least one central wafer in which the moving mass is produced, and two outer wafers having stop elements for the moving mass, thus making it possible to limit the amplitude of the movements which the said moving mass can be made to experience, and thus to optimize the protection of the moving mass and of the suspension arms. An example of an accelerometer made up of at least three silicon wafers according to the known art is illustrated in FIG. 1.

More specifically, FIG. 1 illustrates a cross-section through this type of accelerometer the manufacture of which is, in particular, the result of assembling 4 silicon wafers, a so-called upper wafer constituting part of the fixed frame and comprising upper stops Bs, two central wafers constituting the moving mass 1 and part of the fixed frame and a fourth wafer, called the lower wafer, comprising part of the fixed frame and a stop plane Bi for the lower face of the moving mass.

To simplify the architecture of this type of accelerometer and make the method of manufacturing it easier, accelerometers are known which result from assembling two wafers in which all the elements and functions are defined (moving mass, suspension arms, frame) as disclosed in Application WO 95/04284 or U.S. Pat. No. 5,121, 633.

SUMMARY OF THE INVENTION

The application also proposes a simplified architecture in which the stops and counter-stops functions are cunningly produced.

More specifically, the subject of the invention is an accelerometer comprising a moving mass connected to a fixed frame, the moving mass and the fixed frame being defined in a stack of two monocrystalline silicon wafers known as the upper wafer and the lower wafer, characterized in that:

the upper wafer comprising [sic]:
  the upper part of the moving mass, including a first and a second counter-stop along an axis Y defined in the plane of the moving mass;
  the upper part of the fixed frame, including a first and a second stop along an axis X perpendicular to the axis Y and defined in the plane of the moving mass;
  the upper part of the moving mass and the upper part of the fixed frame being connected by suspension arms;
the lower wafer comprising [sic]:
  the lower part of the moving mass, including
  a third and a fourth counter-stop along the axis X;
  the lower part of the fixed frame, including a third and a fourth stop along the axis Y;
the first and second counter-stops being opposite the third and fourth stops respectively;
the third and fourth counter-stops being opposite the first and second stops respectively.

By convention, the stops are defined as fixed elements of the accelerometer, against which counter-stops, which are moving elements of the accelerometer, come to rest.

According to an alternative form of the invention, the accelerometer is characterized in that:

the upper part of the moving mass comprises a first central part and first and second immobilizing arms lying one on either side of the said first central part, along the axis Y;

the upper part of the fixed frame comprises a peripheral part and first and second arms lying inside the peripheral part, along the axis X, the upper wafer comprising first and second suspension arms connecting the central part of the upper part of the moving mass to the first and second arms of the peripheral part;

the lower part of the moving mass comprises a central part and third and fourth immobilizing arms lying one on either side of the said second central part, along the axis X;

the lower part of the fixed frame comprises a peripheral part and third and fourth arms lying inside the peripheral part along the axis Y;

the first and second counter-stops being defined in the first and second immobilizing arms;

the first and second stops being defined in the first and second arms;

the third and fourth counter-stops being defined in the third and fourth immobilizing arms;

the third and fourth stops being defined in the third and fourth arms.

According to an alternative form of the invention, the wafers 6 and 7 of the accelerometer comprise slender guide arms connecting the moving mass 1 to the frame 3 in such a way that only movements of the moving mass along an axis Z perpendicular to the plane of the said mass are possible. Advantageously, these arms may lie along two axes oriented at 45° to the axes X and Y and lying towards the top of the wafer 6 and towards the bottom of the lower wafer 7, that is to say in planes which correspond to the outer plane of the wafer 6 and to the outer plane of the wafer 7, the inner planes of the said wafers corresponding to the plane of contact of these said wafers.

BRIEF DESCRIPTION OF THE DRAWINGS

The invention will be better understood, and other advantages will become apparent from reading the description which will follow, which is given without implied limitation and with support from the appended figures, among which.

DETAILED DESCRIPTION OF THE EMBODIMENTS

Figure 1:
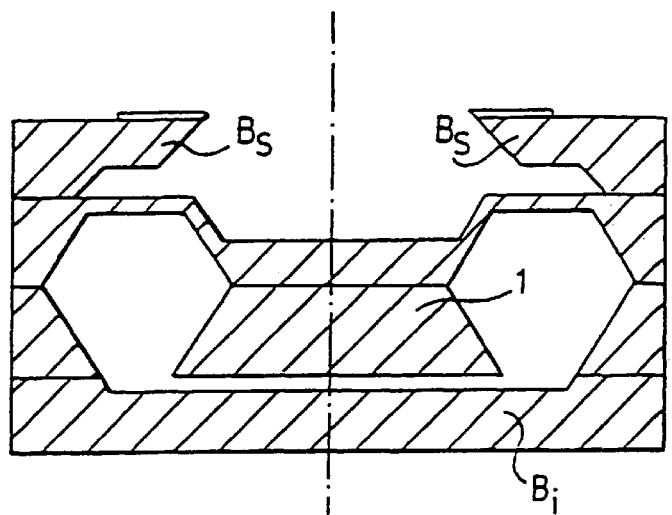
FIG. 1 illustrates an accelerometer according to the prior art.
Figure 2A:
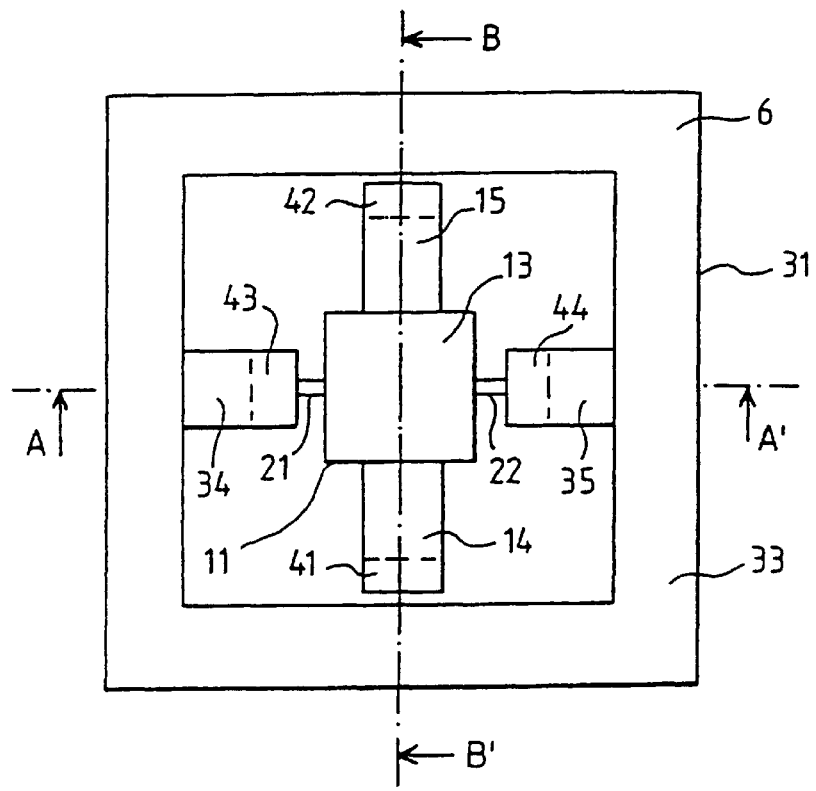
FIG. 2a illustrates the upper wafer used in one example of an accelerometer according to the invention.
Figure 2B:
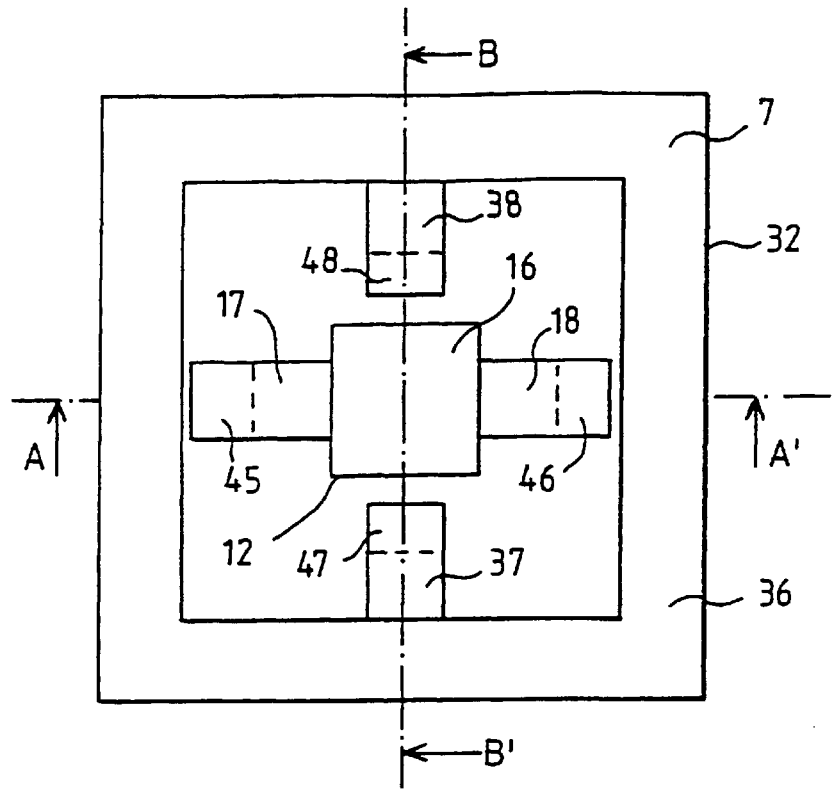
FIG. 2b illustrates the lower wafer used in one example of an accelerometer according to the invention.

One embodiment of the accelerometer according to the invention is illustrated by FIGS. 2 and 3 together. FIGS. 2a and 2b relate to the wafers 6 and 7 the stacking of which allows the moving mass 1 connected to a fixed frame 3 to be defined.

FIG. 2a relates to the upper wafer 6. This wafer 6 comprises the upper part 11 of the moving mass consisting of a central part 13 and of two immobilizing arms 14 and 15 lying one on either side of the central part and, in FIG. 2a, oriented along the axis Y.

The upper wafer 6 also comprises the upper part 31 of the fixed frame, consisting of a peripheral part 33 and of two arms 34 and 35, which in FIG. 2a are oriented along the axis X.

Part 42 of the immobilizing arm 15, and part 41 of the immobilizing arm 14 constitute counter-stops on the part 11 of the moving mass.

Part 43 of the arm 34 and part 44 of the arm 35 constitute stops on the part 31 of the fixed frame.

This wafer 6 also comprises two suspension arms 21 and 22 connecting the central part 13 of the moving mass to the arms 34 and 35 secured to the fixed frame.

FIG. 2b relates to the lower wafer 7. This wafer 7 comprises the lower part 12 of the moving mass consisting of a central part 16 and of two immobilizing arms 17 and 18 which in the figure are oriented along the axis X.

The wafer 7 also comprises the lower part 32 of the fixed frame, consisting of a peripheral part 36 and. of two arms 37 and 38 which in the figure are oriented along the axis Y.

Part 42 of the immobilizing arm 15 and part 41 of the immobilizing arm 14 constitute counter-stops facing the stop 48 part of the arm 38 and the stop 47 part of the arm 37, respectively.

Likewise, part 45 of the immobilizing arm 17 and part 46 of the immobilizing arm 18 constitute counter-stops facing the stop 43 of the arm 44 and the stop 44 of the arm 45, respectively.

Figure 3A:
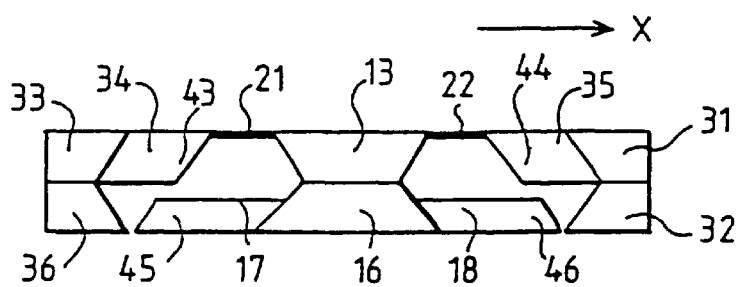
FIG. 3a illustrates a cross-section on a plane depicted by the axis AA' of the assembly of wafers 6 and 7 depicted in FIGS. 2a and 2b.
Figure 3B:
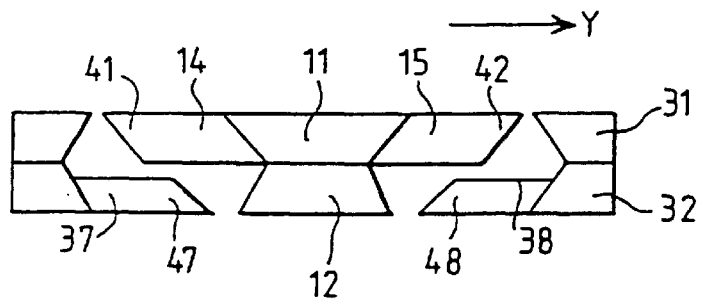
FIG. 3b illustrates a cross-section on a plane depicted by the axis BB' of the assembly of wafers 6 and 7 depicted in FIGS. 2a and 2b.

FIGS. 3a and 3b illustrate how the various stops and the various counter-stops can be produced.

The arms 17, 18, 37 and 38 of the lower wafer 7 have the same architecture. They consist of a second element of thickness $e_1$ less than the thickness $e_0$ of a silicon wafer. The difference in thickness between these arms and the other parts of the silicon wafer makes it possible to form stops or counter-stops for the counter-stops or stops which respectively face them.

The arms 14, 15, 34 and 35 of the upper wafer 6 all have the same architecture. They consist of a single element of thickness $e_0$, part of each arm facing the thinned part which constitutes an arm in the lower wafer 7.

We are going to describe one example of the method for producing an accelerometer according to the invention, built from a stack of two silicon wafers.

FIGS. 5 and 6 respectively illustrate the steps in the method for producing the lower wafer, without the piezoresistive gauge, and the method for producing the upper wafer with piezoresistive gauges.

More precisely, FIG. 5 as a whole describes the production of the elements 36, 17, 16 depicted in FIG. 3a, and FIG. 6 as a whole describes the production of the elements 33, 43, 21, 13 depicted in FIG. 3a.

To give the accelerometer a certain degree of robustness, the upper and lower wafers may comprise slender guide arms, which hold the moving mass in place relative to the fixed frame.

Figure 4A:
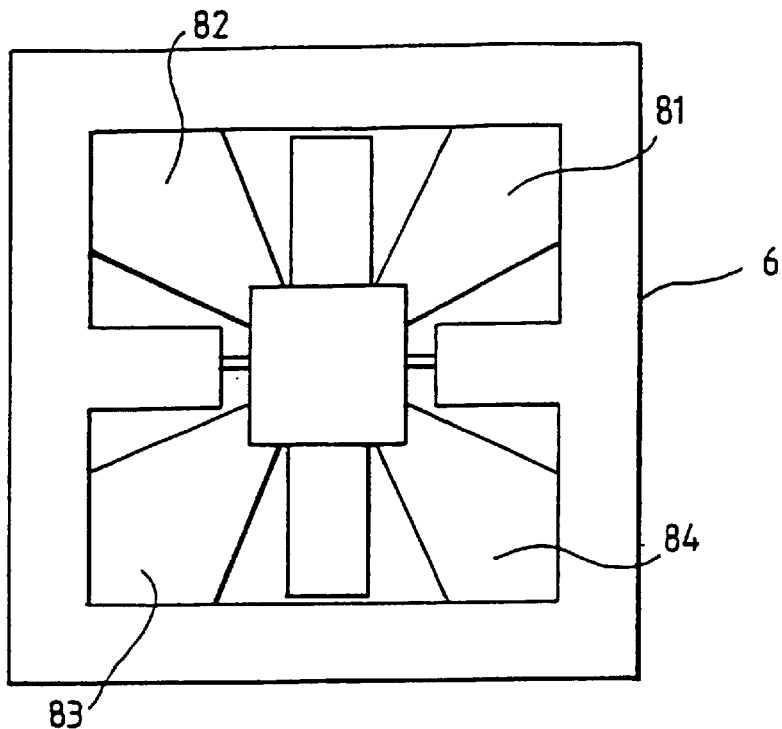
FIG. 4a illustrates one example of a wafer 6 with four guide arms.
Figure 4B:
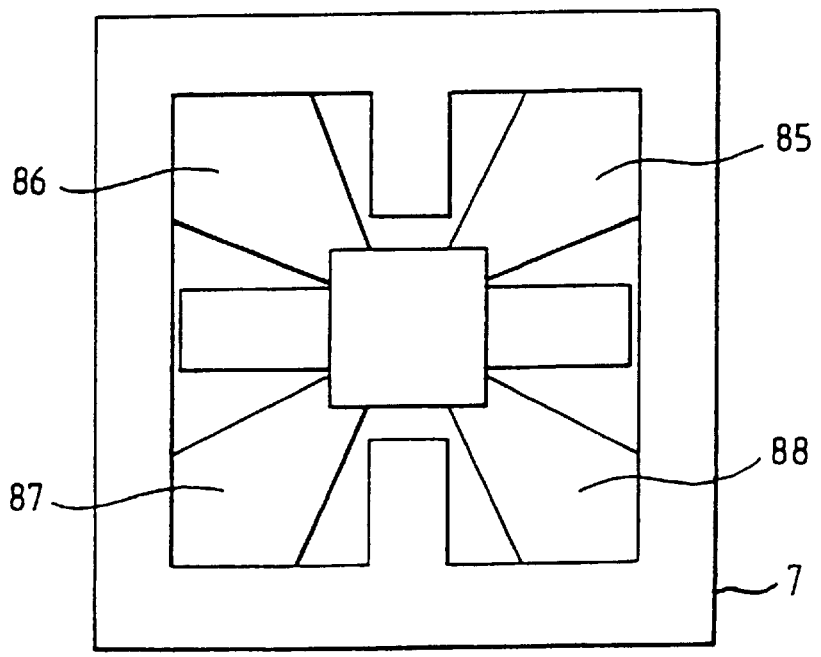
FIG. 4b illustrates one example of a wafer 7 with four guide arms.

FIGS. 4a and 4b illustrate one example of a configuration in which the upper wafer comprises four guide arms 81, 82, 83, 84 (FIG. 4a) and the lower wafer also comprises four guide arms 85, 86, 87, 88 (FIG. 4b). Typically, the guide arms may have a thickness similar to that of the suspension arms 21 and 22 and be situated, on the one hand, in the upper part of the wafer 6 (in the same plane as the suspension arms) and, on the other hand, be situated in the lower part of the wafer 7.

Figure 5A:
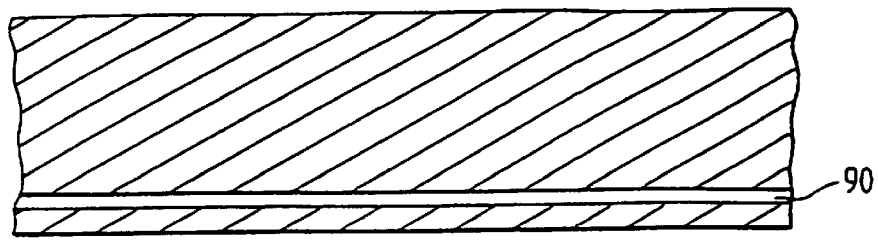
FIGS. 5a–5h illustrates the steps in a method for producing a lower wafer used in an accelerometer according to the invention.

In order to construct the various elements of the lower wafer 7, use may be made of a substrate of the SIMOX type which corresponds to a monocrystalline silicon substrate in which a layer of oxide 90 is embedded (FIG. 5a).

Figure 5B:
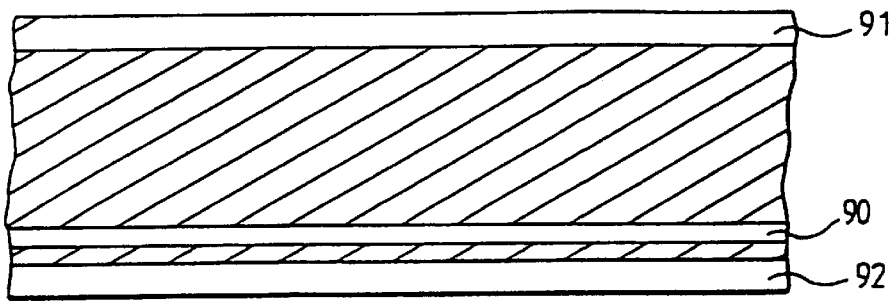

Two layers of oxide or of nitride 91 and 92 are then produced on the two faces of the substrate of the SIMOX type (FIG. 5b).

Figure 5C:
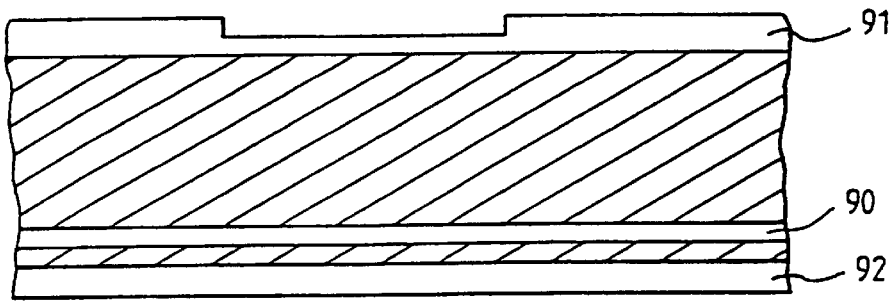

A mask is produced by photolithography and etching at the layer 91 (FIG. 5c).

Figure 5D:
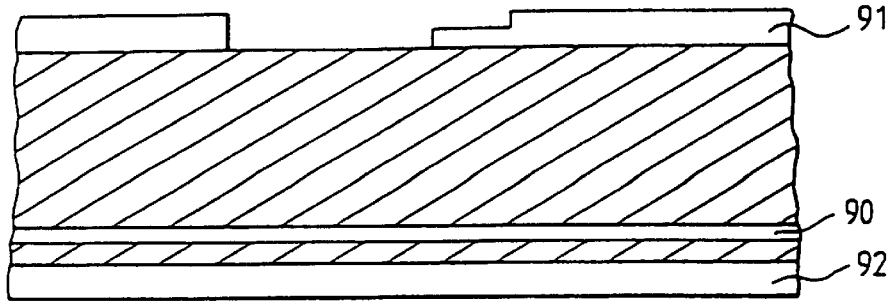

This mask is refined by a second etching step, as illustrated in FIG. 5d.

Figure 5E:
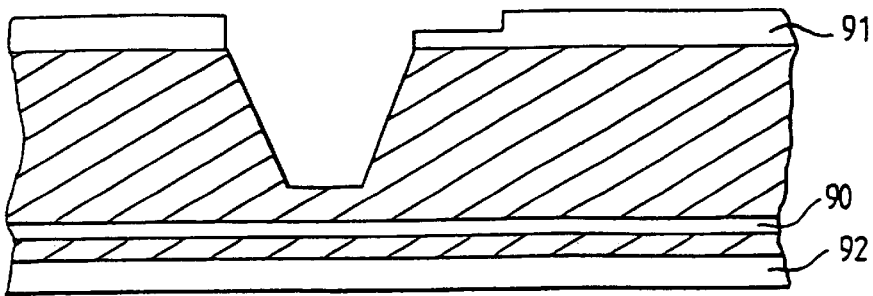

The silicon is chemically etched in the conventional way in the regions which have no protective layer (FIG. 5e).

Figure 5F:
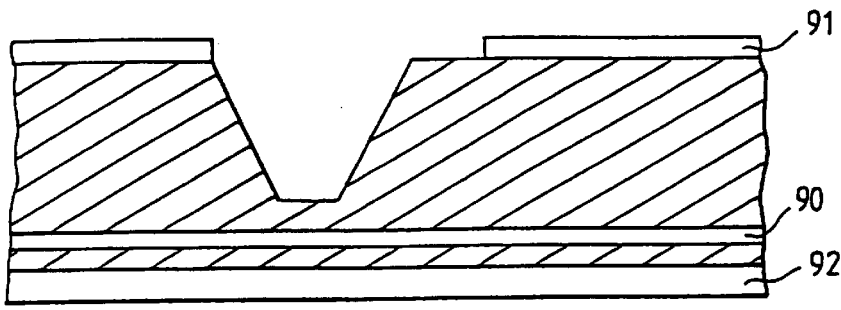

The layer of oxide or of nitride 91 is then thinned down as illustrated in FIG. 5f.

Figure 5G:
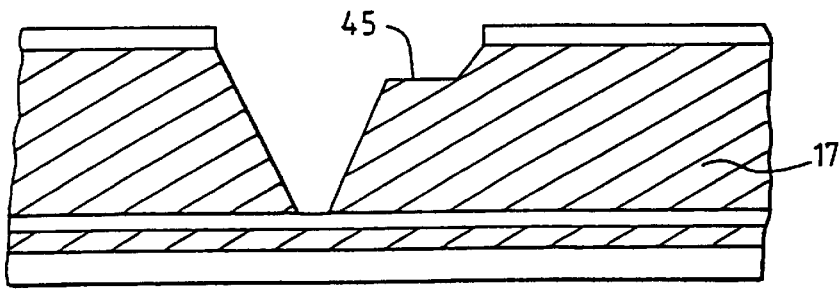

A second step of etching of the silicon is then carried out in order to define the counter-stop 45 in the immobilizing arm 17 (FIG. 5g).

Figure 5H:
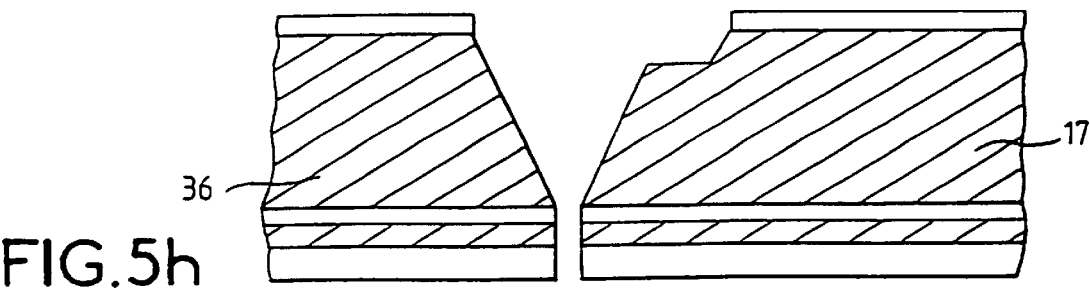

Finally, a laser etching step is carried out, which leads to the immobilizing arm 17 being separated from the peripheral part 36 of the fixed frame (FIG. 5h).

In order to achieve the desired functions on the upper water 6, it may be particularly advantageous to use a silicon wafer in which two insulating layers 93 and 94 have been made, the said wafer moreover being covered with an insulating layer 95 on the opposite face.

The two embedded layers 93 and 94 may be produced in various ways.

Figure 6A:
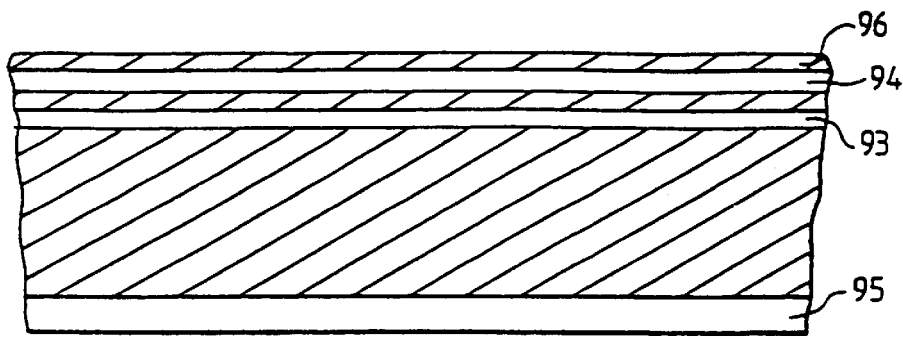
FIGS. 6a–6e illustrates the steps in the method of producing an upper wafer used in an accelerometer according to the invention.

Use may be made of a wafer of the SIMOX type, in which the layer 93 is embedded in the conventional way. In the conventional way, a layer 4000 Å thick may be embedded at a depth of about 4000 Å. It is then possible to grow the layer of monocrystalline silicon by epitaxy. The layer of oxide 94 can then be embedded in this epitaxially grown layer (FIG. 6a).

Another method consists in the high-temperature welding of two silicon wafers one of which is oxidized at its surface. This yields an assembly of two silicon wafers joined together at the oxide layer which then constitutes the layer 93. One of the wafers can then be machined so as to define the desired thickness of silicon in which oxygen can be embedded ionically to define the layer 94.

Figure 6B:
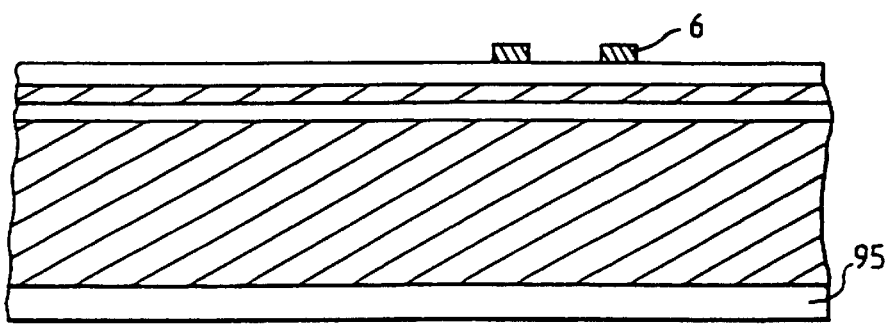

The thin layer 96 makes it possible to define silicon elements which are isolated from the rest of the wafers and may constitute piezoelectric gauges which are better defined and calibrated than those which result from implantation within a silicon substrate in a conventional way (FIG. 6b).

Figure 6C:
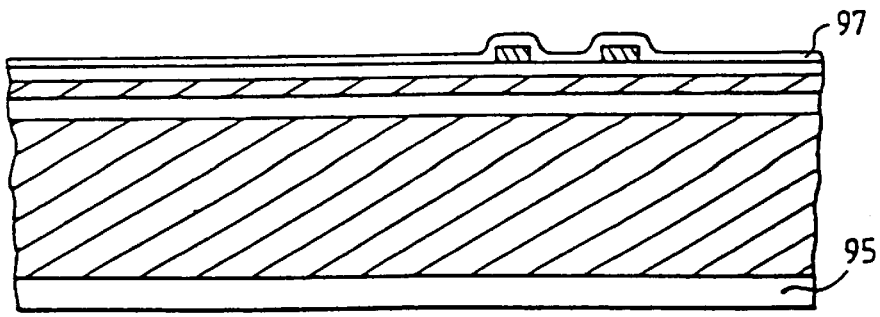
Figure 6D:
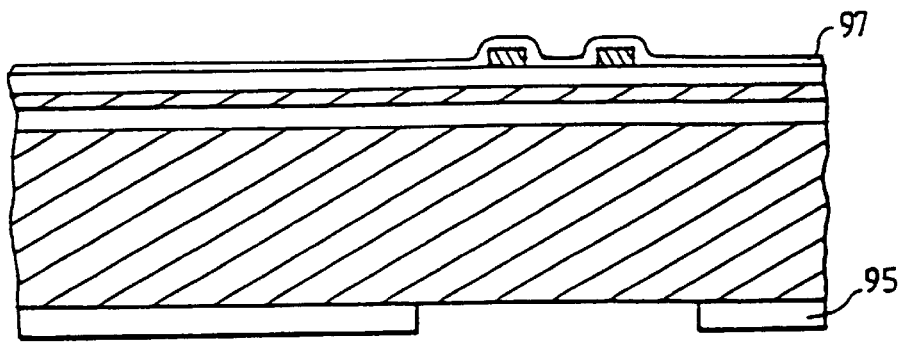
Figure 6E:
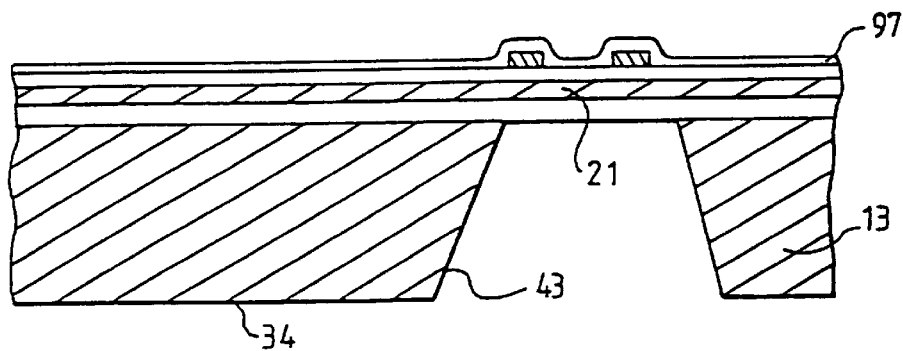

The piezoelectric gauges are protected by a layer 97 of nitride, for example, or of oxide, or of both and openings are produced locally at the layer 97 to allow for the electrical connections (FIG. 6c).

A conductive layer can then be deposited and then etched in order, in the known way, to form tracks for connecting each gauge, these not being depicted in FIG. 6c.

A mask is produced by etching through the layer 95 as illustrated in FIG. 5d.

The manufacture of this mask is followed by a step of etching the silicon chemically, making it possible to define the suspension arm 21, the arm 34 with its stop 43, and the upper central part of the moving mass 13.

The two silicon wafers 6 and 7 thus machined may be welded by heating typically to a temperature of the order of 1000° C.

The two wafers may be joined together before the laser cutting illustrated in FIG. 5h is performed, thus making it possible to detach the immobilzing arm 17 from the peripheral part of the frame 36, so as to make-the said assembly easier.

All the steps described hereinabove are also used to produce the arms 14, 15, 37 and 38 along the axis Y.

The slender guide arms 81, 82, 83, 84 can also be produced in the upper wafer in the same way as the slender suspension arms and in the same plane, thanks to the etching arresting layer.

The slender guide arms 85, 86, 87, 88 can also be produced in the lower wafer thanks to the layer of silicon which lies between the layers of oxide 90 and 92.

What is claimed is:

1. An accelerometer comprising:
  a moving mass connected to a fixed frame, wherein the moving mass and the fixed frame are defined in a stack of upper and lower monocrystalline silicon wafers;
  said upper monocrystalline silicon wafer including:
    an upper part of the moving mass, including two upper counter-stops along a first axis defined in a plane of the moving mass and positioned on opposite sides of a central portion of the upper part of the moving mass;
    an upper part of the fixed frame, including two upper stops along a second axis perpendicular to the first axis and defined in the plane of the moving mass and positioned on opposite sides of the central portion of the upper part of the moving mass;
    wherein the upper part of the moving mass and the upper part of the fixed frame are connected by first and second suspension arms;
  said lower monocrystalline silicon wafer including:
    a lower part of the moving mass, including two lower counter-stops along the second axis positioned on opposite sides of a central portion of the lower part of the moving mass;
    a lower part of the fixed frame, including two lower stops along the first axis positioned on opposite sides of the central portion of the lower part of the moving mass;
  wherein the two upper counter-stops are opposite the two lower stops; and
  wherein the two lower counter-stops are opposite the two upper stops.

2. An accelerometer comprising:
  a moving mass connected to a fixed frame wherein the moving mass and the fixed frame are defined in a stack of upper and lower monocrystalline silicon wafers;
  said upper monocrystalline silicon wafer including:
    an upper part of the moving mass including two upper counter-stops along a first axis defined in a plane of the moving mass;
    an upper part of the fixed frame, including two upper stops along a second axis perpendicular to the first axis and defined in the plane of the moving mass;
    wherein the upper part of the moving mass and the upper part of the fixed frame are connected by first and second suspension arms;
  said lower monocrystalline silicon wafer including:
    a lower part of the moving mass, including two lower counter-stops along the second axis;
    a lower part of the fixed frame, including two lower stops along the first axis;
  wherein the two upper counter-stops are opposite the two lower stops;
  wherein the two lower counter-stops are opposite the two upper stops; and
  wherein:
  in said upper monocrystalline silicon wafer,
    the upper part of the moving mass includes an upper central part and two upper immobilizing arms on opposite sides of said upper central part along the first axis; and
    the upper part of the fixed frame includes an upper peripheral part and two upper frame arms inside the upper peripheral part along the second axis, and said upper monocrystalline wafer further including two suspension arms connecting the upper central part of the upper part of the moving mass to the two upper frame arms of the upper peripheral part;
  in said lower monocrystalline silicon wafer,
    the lower part of the moving mass includes a lower central part and two lower immobilizing arms on opposite sides of the lower central part, along the second axis; and
    the lower part of the fixed frame includes a lower peripheral part and two lower frame arms inside the lower peripheral part, along the second axis;
  the two upper counter-stops are defined in the two upper immobilizing arms;
  the two upper stops are defined in the two upper frame arms;
  the two lower counter-stops are defined in the two lower immobilizing arms;
  the two lower stops are defined in the two lower frame arms.

3. An accelerometer according to claim 2, wherein the upper and lower monocrystalline wafers further include guide arms connecting the moving mass to the fixed frame, said guide arms extending along two axes oriented at 45° to the first and second axes.

4. An accelerometer according to claim 3, wherein the upper monocrystalline silicon wafer comprises four upper guide arms and the lower monocrystalline silicon wafer comprises four lower guide arms, said four upper guide arms extending towards a top of the upper monocrystalline silicon wafer, and said four lower guide arms extending towards a bottom of the lower monocrystalline silicon wafer.

5. An accelerometer according to claim 2, wherein the first and second suspension arms comprise piezoresistive gauges.

6. An accelerometer according to claim 3, wherein the first and second suspension arms comprise piezoresistive gauges.

7. An accelerometer according to claim 4, wherein the first and second suspension arms comprise piezoresistive gauges.

8. An accelerometer according to claim 1, further comprising a system for electromagnetically controlling the moving mass.

9. An accelerometer according to claim 2, further comprising a system for electromagnetically controlling the moving mass.

10. An accelerometer according to claim 3, further comprising a system for electromagnetically controlling the moving mass.

11. An accelerometer according to claim 4, further comprising a system for electromagnetically controlling the moving mass.

12. An accelerometer according to claim 5, further comprising a system for electromagnetically controlling the moving mass.

13. An accelerometer according to claim 6, further comprising a system for electromagnetically controlling the moving mass.

14. An accelerometer according to claim 7, further comprising a system for electromagnetically controlling the moving mass.

* * * * *